United States Patent
Benning et al.

(10) Patent No.: US 7,070,703 B2
(45) Date of Patent: Jul. 4, 2006

(54) PROCESS FOR PRODUCING GLASS DISK SUBSTRATES FOR MAGNETICALLY RECORDABLE DATA STORAGE DISKS

(75) Inventors: Frederick P. Benning, Rochester, MN (US); Steven L. Maynard, Rochester, MN (US); David C. Paurus, Byron, MN (US); Jon Edward Podolske, Plainview, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 237 days.

(21) Appl. No.: 10/154,024

(22) Filed: May 23, 2002

(65) Prior Publication Data

US 2003/0217989 A1    Nov. 27, 2003

(51) Int. Cl.
*B44C 1/22* (2006.01)
*B24B 1/00* (2006.01)

(52) U.S. Cl. .............................. 216/89; 216/22; 216/31; 216/88; 451/41; 451/285; 451/287; 451/290

(58) Field of Classification Search ................ 216/22, 216/31, 89, 88; 451/41, 285, 287, 290
See application file for complete search history.

(56) References Cited

U.S. PATENT DOCUMENTS

| | | | | |
|---|---|---|---|---|
| 5,645,471 A | * | 7/1997 | Strecker ...................... | 451/59 |
| 5,691,256 A | * | 11/1997 | Taguchi et al. ............... | 501/63 |
| 5,742,026 A | * | 4/1998 | Dickinson et al. ..... | 219/121.69 |
| 5,997,392 A | * | 12/1999 | Chamberlin et al. ......... | 451/446 |
| 6,134,918 A | * | 10/2000 | Eto et al. .................... | 65/30.14 |
| 6,332,338 B1 | * | 12/2001 | Hashimoto et al. ......... | 65/29.21 |
| 6,354,929 B1 | * | 3/2002 | Adefris et al. .............. | 451/527 |
| 6,582,279 B1 | * | 6/2003 | Fox et al. ..................... | 451/37 |
| 6,596,079 B1 | * | 7/2003 | Vaudo et al. ................. | 117/97 |
| 6,632,547 B1 | * | 10/2003 | Shimada ............... | 428/694 SG |
| 2001/0014573 A1 | * | 8/2001 | Shimoi et al. ................ | 451/41 |

OTHER PUBLICATIONS

Co-pending patent application "Self Cleaning Colloidal Slurry Composition and Process for Finishing a Surface of a Substrate"; U.S. Appl. No. 09/976,167; Filed: Oct. 12, 2001.

* cited by examiner

*Primary Examiner*—Shamim Ahmed
(74) *Attorney, Agent, or Firm*—Zilka-Kotab, PC

(57) ABSTRACT

A polished glass disk is prepared for a magnetically recordable coating by texturing the surfaces with a highly abrasive material being abrasively engaged with the surfaces as the disk is rotated, thereby creating a relatively coarse texture with the abrasions concentric with the axis of rotation of the disk. Thereafter, the roughness of the texturing is reduced by abrading the surface of the disk with a polishing pad and an etchant slurry of colloidal silica. The etchant component has the property of attacking or softening the glass disk during the fine polishing with the colloidal silica slurry. As both the texturing step and the fine polishing step deposit a plurality of concentric abrasions on a glass disk, these abrasions aid in retaining the magnetically recordable coating deposited thereon to complete a magnetically recordable disk for use as a data storage member.

7 Claims, 2 Drawing Sheets

PROCESS FOR PRODUCING GLASS DISK SUBSTRATES FOR MAGNETICALLY RECORDABLE DATA STORAGE DISKS

RELATED CO-PENDING UNITED STATES PATENT APPLICATION

This patent application is related to co-pending United States patent application entitled "Self Cleaning Colloidal Slurry Composition and Process for Finishing A Surface of A Substrate," by Frederick Paul Benning, et al., having patent application Ser. No. 09/976,167, filed Oct. 12, 2001, and which is incorporated hereinto for purposes of disclosure.

FIELD OF THE INVENTION

This invention relates to manufacturing magnetic recording disks for the storage of data and, more specifically, relates to a process of preparing a glass disk substrate for coating with a magnetically recordable data storage layer.

BACKGROUND OF THE INVENTION

As disk drives for storing data have improved in data density, data capacity, and response times, it is apparent that a higher reliability level of magnetic recording disks must be provided with respect to both data signal recording and operability. One factor affecting operability and reliability of a disk drive is the quality of the bond between the substrate of a disk and the magnetic recording media coated thereon to form the magnetic recording layer.

Delamination of the magnetic recording media layer from the glass disk substrate is one cause of disk failures. Both the disk and magnetic recording media are subject to very large and severe centrifugal forces due to the very high revolutionary speeds of a disk during disk drive operation.

Previously, polishing and texturing of a glass disk substrate would result in relatively deep gouges and grooves which could harbor abrasive polishing particles, glass particles and chips, and/or contaminants from chemical strengthening baths; these are examples of debris which commonly can result from a polishing operation and ion exchange processes. Debris is an obstacle to reliable and complete adherence of the magnetic recording media coating to the glass substrate. Wherever a weak or nonexistent bond between the coating and the disk substrate occurs, the bond strength and coating strength are inadequate to prevent delamination of the magnetic recording media coating or layer and results in disk failures.

Additionally, the roughness of a glass disk surface can be a deleterious factor in coating the glass disk substrate and can prevent production of a very smooth surface of the magnetic recording media final surface. The roughness of the final surface also affects or at least influences the flight characteristics of the read/write head and, consequently, the quality of the read and record signals.

OBJECTS OF THE INVENTION

It is an object of the invention to provide an improved magnetically recordable data storage disk.

It is an another object of the invention to improve the signals read from a magnetic data storage disk.

It is a further object of the invention to reduce disk failures related to the magnetic recording media on a glass disk substrate.

It is an additional object of the invention to prevent delamination of the magnetic recording media from a glass disk substrate.

It is still another object of the invention to improve the surface characteristics of a disk substrate which affect the reliability of the bonding of the magnetic recording layer of a magnetic recording disk.

SUMMARY OF THE INVENTION

In order to accomplish the above objects of the invention, a glass disk is first polished to provide a very smooth surface on both faces of the glass disk which will serve as a substrate for a magnetic disk drive. A chemical strengthening step is performed with an ion bath to exchange ions with the surface material on the surface of the glass disk. This step beneficially changes the structure of the surface. Then, as the glass substrate rotates, the surface of the glass substrate is textured by engaging diamond particles or another very abrasive material with the rotating surface, which results in a concentric pattern of relatively rough abrasions.

Thereafter, a slurry of colloidal silica contained in an etchant fluid is sprayed over the disk as the disk rotates; and, a polishing pad is rotationally engaged with each face of the substrate to reduce the rough texture to a smoother texture while maintaining the concentric pattern of abrasions on the glass disk substrate deposited or formed by the diamond abrasion step. This polishing step reduces the texture to a medium texture (5–8 Å).

The substrate is thereafter cleaned, and the abrasive material and glass abrasion debris are removed.

Once dried, the glass disk substrate has a lightly textured surface, which is well adapted for adhesion of the magnetic recording media to the textured surfaces.

An alternate process sequence following the diamond texturing step is a scrubbing operation which utilizes the same type of polishing equipment and scrubber pads to provide a medium texture (5–7 Å) to the glass surfaces.

Should it be determined that a heavy texturing step is not needed or desirable, the chemical strengthening step may be followed by alternative operations. One alternative is a polishing step using the colloidal silica slurry and scrubber pads to produce an isotropic medium texture (5–7 Å) while polishing and cleaning the substrates. Another alternative process sequence uses a scrubbing machine with polishing pads and colloidal silica slurry to provide a very, very light texture or "superfinish" with a roughness of only 1–3 Å while imparting a circumferential or concentric texture pattern to the very, very light abrasion of the superfinished surface.

Alternatively, the scrubbing machine may be operated using scrubbing pads, to scrub the surfaces of the just previously chemically strengthened surface to remove any surface contaminants deposited from the chemical strengthening bath and process step.

As the final step of the process preparing a disk for further coating with magnetically recording media, the disk is cleaned.

This Summary of the Invention is provided to summarize the invention but not to provide any basis for limiting the invention in any manner.

DETAILED DESCRIPTION OF BEST MODE OF THE PREFERRED EMBODIMENT OF THE INVENTION AS CONTEMPLATED BY THE INVENTORS

Figure 1:
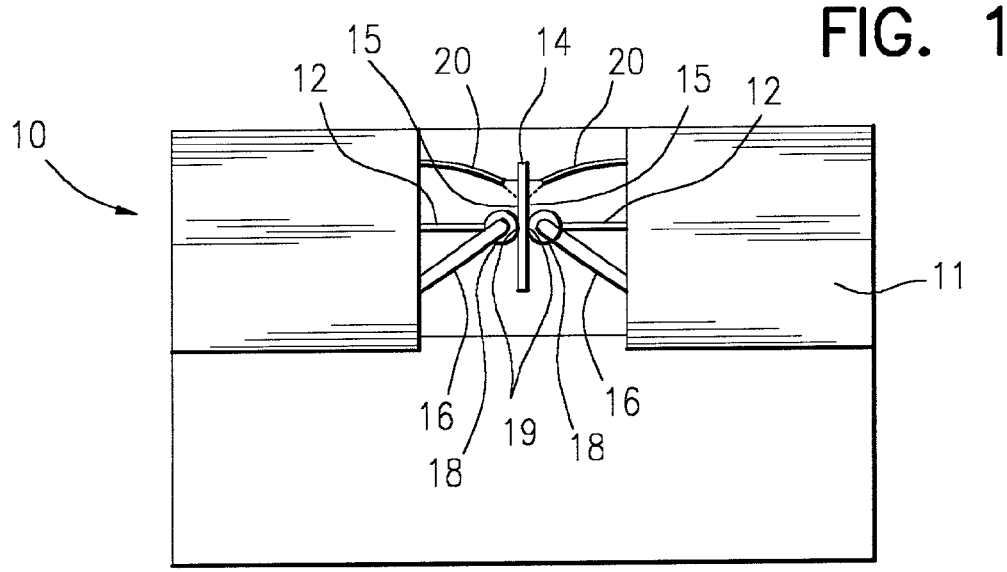
FIG. 1 illustrates a type of polishing machine on which the texturing of the substrate surfaces is accomplished.

With reference to FIG. 1, the invention is best understood by first understanding the equipment which is used to perform the process, which is the invention.

FIG. 1 illustrates a schematic representation of a disk polisher/scrubber 10 used in the practice of the invention. Such a polisher/scrubber, the Oliver Circumferential Polishing System, is available from Oliver Design, Inc. of Scotts Valley, Calif.

Figure 3:
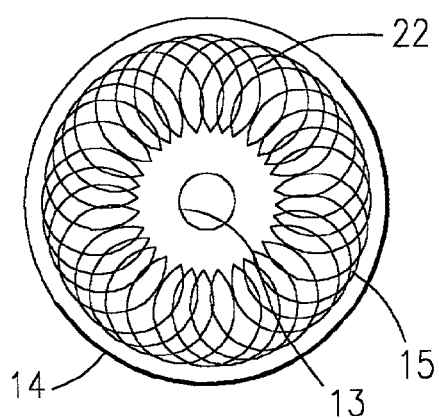
FIG. 3 illustrates a glass disk substrate having a pattern of polishing scratches remaining after a glass disk is polished to a smooth planar surface.
Figure 4:
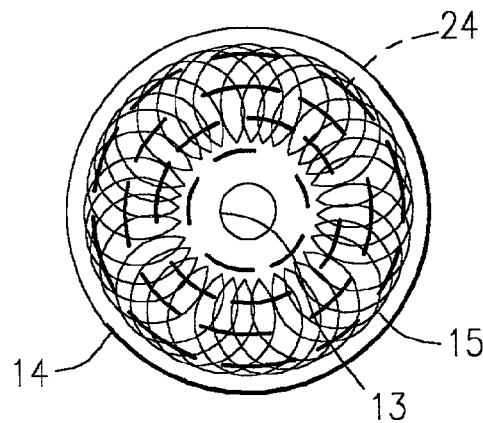
FIG. 4 illustrates a glass disk substrate having a pattern of polishing scratches remaining after a glass disk is polished, providing a concentric texturing by abrasion with the diamond polishing compound.
Figure 5:
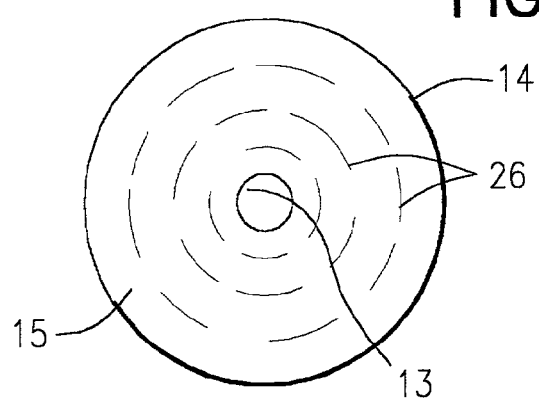
FIG. 5 illustrates a glass disk substrate having an abrasion pattern after colloidal silica slurry polishing in order to lighten the texture and clean the surface of the glass disk.

Polisher 10 includes a cabinet housing 11 enclosing conventional motors, controls and drives (not shown). Arbors or rotatable supports 12 are mounted within the cabinet 11 and driven by the motors and drives (not shown) to rotate the arbors 12. For treatment and polishing, the arbors 12 are adapted to support and rotate a glass disk 14 or circular sheet of glass 14 having a central aperture or hole 13 (as shown in FIGS. 3, 4 and 5). The polisher 10 further includes a pair of supports 16 moveable into and out of positions whereby scrubbing or polishing pads 18 in the form of cylinders 18 carried by the supports 16 can be tangentially engaged with the glass disks 14. Pads 18 may be procured with various characteristics which adapt the polisher 10 to a polishing or a scrubbing action.

Further, the polisher 10 includes the ability to rotate both the polishing pads 18 in counter-rotation to each other and also each polishing pad 18 counter to the direction of movement of the disk 14 at the engagement points 19 or nips 19 between the disk 14 and polishing pads 18. Polishing slurry (not shown) may be provided through sprayers 20 or other convenient devices with slurry pumped from a reservoir (not shown) within the cabinet 11.

With this understanding of the equipment used, it should be understood that where different steps are performed and although such steps are described as being essentially identical, such different steps may be and preferably are performed on different identical or very similar machines in the interests of manufacturing efficiency.

The following description of the process constituting the invention provides one of ordinary skill in the art of glass disk polishing with the information and background to practice the invention.

Figure 2:
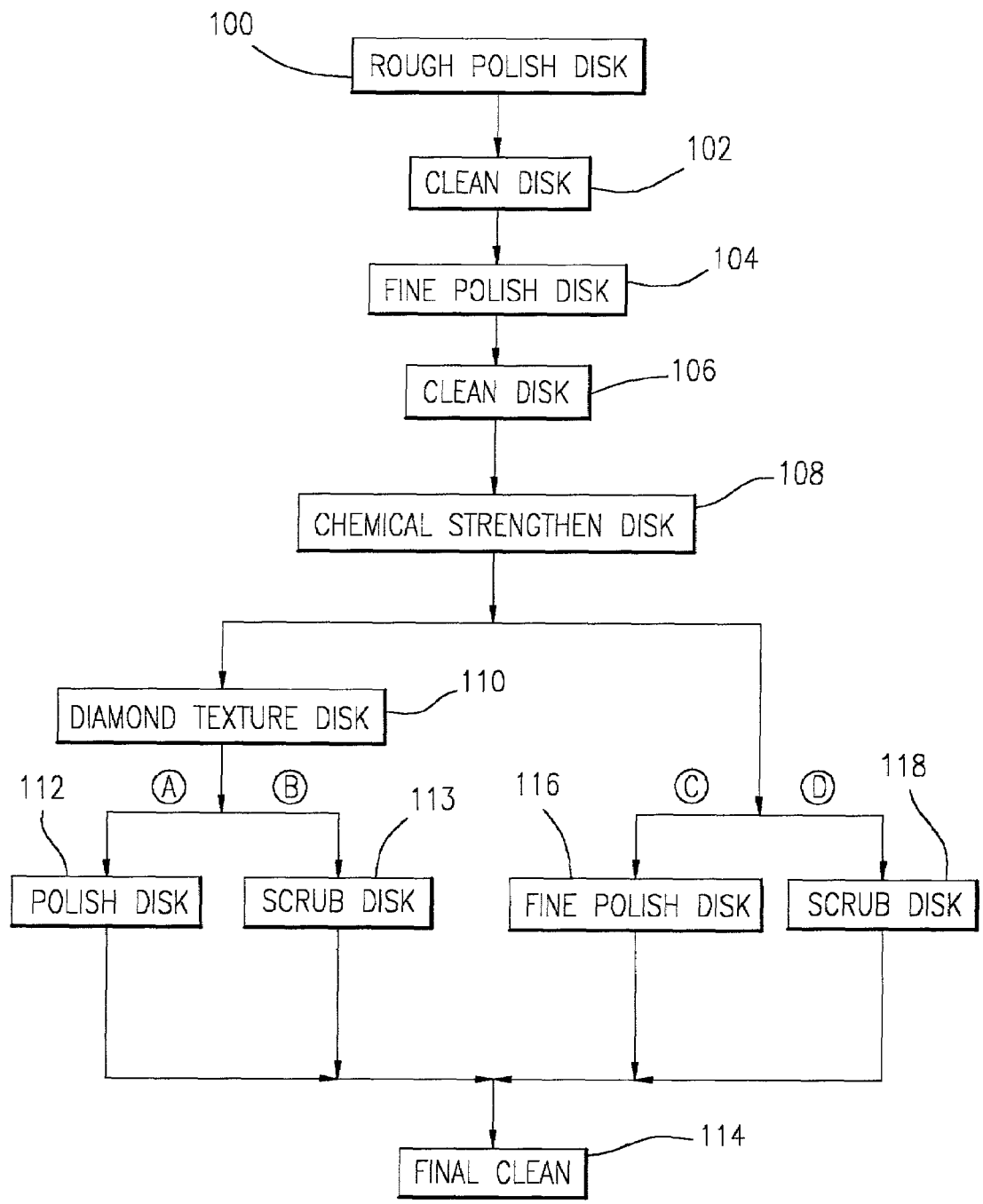
FIG. 2 illustrates a polishing and cleaning process in block diagram form as well as four alternative paths representing various embodiments of the process.

Refer now to FIG. 2 which illustrates the process of preparing a glass substrate, the subject of this Application, and includes the inventive sequences and steps. The flow diagram of steps or operations in FIG. 2 includes four alternate flow paths illustrating the various embodiments of the invention.

Whenever reference is made to a glass disk surface, the operation performed thereon is inclusive of both planar disk surfaces 15, assuming that both surfaces 15 are intended to be finished as recording surfaces.

As is conventional, a disk 14 is rough-polished on any conventional and suitable polishing machine, in operation 100 of FIG. 2, to coarse or rough polish the glass disk surface 15. The rough polish step 100 renders the glass surface 15 polished to a roughness of 10–15 Å and renders the surface isotropic. Polishing is preferably accomplished with polishing pads 18 and a cerium slurry. The slurry used in step 100 has cerium particles incorporated in a size range of 1.5 µm to 2.5 µm.

In step 102, both the cerium slurry and cerium particles are removed from the disk 14 with a washing operation using water.

FIG. 3 illustrates a polished disk 14 with minor or slight cycloid scratches 22 remaining after the initial polishing action such as operations 100, 102 of FIG. 2 of a polisher, such as a Peter Wolters Microline AC320 available from Peter Wolters of Plainville, Mass. Although the scratches 22 on the disk 14 are relatively minor, they are oriented across the surface 15, not concentric, and will not be as advantageous once overlaid by the magnetic recording medium (not shown) to complete the recording surface on the disk 14.

Progressing to step 104, a secondary fine polishing step is performed using a finer cerium slurry with the cerium particles therein, in the range of 0.3 µm to 0.6 µm effecting a reduction in roughness of the glass disk surface to 5–8 Å.

A cleaning step substantially identical to operation 102 is performed as operation 106 following operation 104 to remove all the cerium abrasive and fluid carrier from the glass disk surfaces 15.

Thereafter in operation 108, the disk 14 is submerged in an ion exchange bath to conventionally chemically alter and strengthen the glass of the disk substrate 14 at the surface 15. While the ion bath used in Operation 108 is made as pure as possible in all its constituents, there are minor amounts of contaminants or contaminant ions present which adhere to, replace, or otherwise effect the glass surface structure and provide unwanted characteristics.

A typical ion bath product for this purpose is 60/40 Reagent Grade Potassium-Sodium Nitrite Salt available from Cater Chemical Corp. of Wood Dale, Ill. Of course, other suitable ion baths may be secured elsewhere.

In operation 110, a smooth polished chemically-strengthened glass disk 14 is inserted into the polishing machine 10. The disk 14 is clamped between the arbors 12 and positioned for rotation and textured with a coarse abrasive slurry.

Either the polishing pads 18 or, similarly, a tape carrying diamond particles (not shown) are positioned and pressured against the planar surfaces 15 of the glass disk 14 while the disk 14 is rotated in step 100. Simultaneously, as the disk 14 is rotated by the arbors 12, a spray of a polishing slurry is delivered by the sprayers 20 to the surface 15 of the disk 14 and the polishing pads 18 as well as the zone of engagement or nip 19 between the disk 14 and the cylindrical polishing pads 18 or the abrasive tape. The polishing pads 18 are rotated in counter-rotating directions and against the direction of movement of disk 14 at an area of engagement or nip 19 between the rotating disk 14 and the polishing pads 18.

The diamond particles in the slurry, either as incorporated into a liquid carrier or as incorporated into a binder on the tape, are abraded against the glass disk surface 15 as the particles are carried into engagement with the glass disk 14 by the rotating polishing pads 18 or the tape. The relative movement of the abrasive diamond particles abrade the glass disk 14 in a generally concentric pattern of scratches 24 or gouges 24, as seen in FIG. 4, and represented by operation 110 in FIG. 2. While only a few of such scratches 24 or gouges 24 are shown in FIG. 4, the surface 15 is substantially covered with such scratches 24.

As the very abrasive or diamond particles are in contact only with planar surfaces 15 of the glass disk substrate 14 for a relatively short period of time before the polishing pad 18 rotates carrying the particles (not shown) out of the nip 19 between the disk 14 and polishing pad 18, the grooves or scratches 24 are not only generally discontinuous arcs but also of random length and depth, as shown in FIG. 4. This texturing operation is represented by operation 110 in FIG. 2.

While this step 110 of the process of FIG. 2 results in the arcuate concentric grooves or abrasions 24 that improve the quality of the disk 14 and subsequent recordings made on the recording medium layer deposited later to complete the magnetic disk 14, the surface 15 of the glass disk 14 has a roughness (6–9 Å) that needs improvement or smoothing. The deepest grooves 24 cut into the surface 15 in operation 110 provide traps and sites (not shown) that collect debris including glass particles and cerium abrasive material from the slurry used in operations 100, 104, and diamond abrasive in operation 110, any of which may lead to later delamination of the magnetic recording media layer from the disk substrate surface 15 after the disk substrate 15 has been coated with a magnetic recording media.

Refer now to operation 112. In order to improve or reduce the surface roughness and preserve the remaining roughness or texture with an orientation of the abrasions 26 in a concentric pattern, the disk 14 is mounted in a polisher/scrubber 10, such as the polisher 10 displayed in FIG. 1. The polishing machine 10 or polisher 10 is operated in the manner described above except that substituted for diamond abrasives described rather a slurry of an etching solution (not shown) is used, which has the effect of attacking and softening or removing a portion of the glass surface 15, as well as a colloidal silica abrasive (not shown) are used, as illustrated by Operation 112.

The preferred slurry used in this inventive process is the subject of United States patent application "Self Cleaning Colloidal Slurry composition and Process for Finishing A Surface of A Substrate," Ser. No. 09/976,167, filed Oct. 12, 2001, by Frederick Paul Benning, et al. The disclosure of application Ser. No. 09/976,167 is incorporated herein by reference.

The etchant/acid of the slurry attacks and softens the surface portion 15 of the glass disk 14, moreover, the mild abrasive action of the colloidal silica abrades or polishes away the tops of the ridges or spikes (not shown) which have been formed intermediate the gouges 24 or abrasions 24 formed by the diamond particles during the previously described texturing operation 108. By abrading the highest peaks or areas of the texture on the surfaces with a colloidal silica which is a very fine and smoothing abrasive, the surface roughness is reduced while at the same time retains topographical features and orientations that contribute to improved quality in a finished disk, thereby resulting in improved recordability and readability as well as improving the resistance to delamination of the magnetic recording media layer of a finished disk 14. The improved surface 15 of the glass disk substrate 14 is illustrated in FIG. 5.

The scrubbing or polishing operations 112, 113 may use either a scrubber pad 18 or a polisher pad 18 on the Oliver Colloidal Scrubber 10 depending on the texture desired on the surface 15 of the glass disk 14. If a polish pad 18 as illustrated by path A in FIG. 2, is used, the resulting surface roughness will be slightly smoother (5–7 Å) than if the scrubber pads are used as represented by path B and operation 113 in FIG. 2, resulting in a 6–8 Å surface roughness. Operation 112 or operation 113 is followed by a final cleaning operation 114.

A second alternative processing of glass disks 14 may be accomplished by following the chemical strengthening step 108 in FIG. 2 with operation 116 on the Oliver Colloidal Scrubber 10 or equivalent equipment, effectively eliminating the diamond texturing operation 110. This alternative process branches from chemical strengthening operation 108 to operation 116 wherein the glass disk is polished on a OCS machine with polishing pad 18 designed to produce finer finished surfaces in order to give a very smooth (1–3 Å) superfinish or a light texture (2–5 Å) depending on the colloidal silica particle size. This portion of the process is represented by path C in FIG. 2. The minor abrasions left by the colloidal silica slurry will have the desired concentric pattern. This polishing, in conjunction with the colloidal silica slurry, will clean from a glass disk 14 any abrasive particles from the polishing operations 100, 104 as well as any contaminants acquired from the chemical strengthening ion-exchange bath.

A further alternative represented by path D and operation 118 is to use a scrubber 10 with PVA scrubber pads 18 which results in removing any polishing abrasives and ion-exchange bath contaminants from the surface of the disk while the isotropic nature of the surface of the glass disk is preserved. Whenever processed with scrubber pads, the disk surface 15 will have a roughness of 5–8 Å, comparable to the surface roughness resulting from the second polishing step 104 and with the abrasions 26 forming a concentric pattern.

Thereafter a conventional final cleaning step is performed in Operation 114.

Whenever the glass disk substrate 14 is processed as described above, the depth of the abrasions 26 as in FIG. 5 remain on the surface 15 of disk 14 not only are reduced and become shallow but also the surface texture is smoothed. The remaining abrasions 26 form significantly less traps or havens for polishing debris such as residual diamond particles, cerium particles, and/or abraded glass chips and particles.

With the reduction of the ability of the grooves 26 and scratches 26 to trap and harbor such debris as a result of reducing their depth, a subsequent coating of the magnetic recording media onto the disk 14 readily accesses all of surface 15 of the disk 14. Accordingly, adhesion is improved and potential sites of non-adhesion are eliminated, thereby eliminating or reducing delamination starting points.

Further, in addition to the benefit to the recording quality and reduction of soft data errors, the concentric scratches 26 or grooves 26 provide resistance to the centrifugal forces exerted on the magnetic coating of finished disk 14.

This Detailed Description of the Invention is provided to explain the invention and at least one embodiment of the invention but is not provided for a basis for limiting the invention in any manner.

While the invention has been disclosed using at least a preferred embodiment of the invention, it should be understood that a person of ordinary skill in the relevant art may make minor changes to the process disclosed without removing the modified process from the scope of the invention as defined by the appended claims.

We claim:

1. A process of manufacture for producing glass disk substrates for magnetically recordable data storage disks comprising the steps of:
providing a circular flat disk of glass with a hole centered therein;
performing a first polishing process on the glass disk, the first polishing process being a rough isotropic polishing process for forming scratches on the disk, wherein the scratches are not concentric;
after performing the first polishing process, performing a second polishing process on the glass disk, the second polishing process being a fine isotropic polishing process;
chemically strengthening the disk;
after chemically strengthening the disk, texturing the disk to form a plurality of scratches formed as discontinuous, concentric arcs of random length and depth, wherein the texturing of the disk comprises: engaging a cylindrical polishing pad with a surface of the disk, the polishing pad having an axis oriented parallel with a radius of the disk;
rotating the disk;
rotating the cylindrical polishing pad about its axis, counter to the direction of travel of the disk; and
applying a diamond slurry; and
after texturing the disk, performing a third polishing process, the third polishing process being a fine polishing processes performed by engaging a cylindrical polishing pad with a surface of the disk, the cylindrical polishing pad having an axis oriented parallel with a radial axis of the disk, rotating the polishing pad about its axis, and applying an etching solution.

2. A process of manufacture as in claim 1 wherein the first and second polishing processes are performed by engaging a polishing pad with a surface of the disk while rotating the polishing pad about an axis oriented perpendicular to the surface of the disk.

3. The process according to claim 1 wherein said chemically strengthening said sheet of glass further comprises submerging said sheet of glass in an ion exchange bath.

4. The process according to claim 1 wherein said chemically strengthening said sheet of glass further comprises submerging said sheet of glass in an exchange bath comprising Potassium-Sodium Nitrite Salt.

5. A process of manufacture as in claim 1 wherein several of the scratches created by the texturing remain after the third polishing process.

6. A process of manufacturing as in claim 1 wherein the texturing the disk and performing the third polishing process results in a surface roughness of the disk surface of about 5–8 angstroms.

7. A process of manufacture as in claim 1 wherein the texturing of the disk comprises:
engaging first and second cylindrical polishing pads with first and second surfaces of the disk, the first and second cylindrical polishing pads each having an axis oriented parallel with a radial of the disk;
rotating, the disk; and
rotating the each of the first and second cylindrical polishing pads about its axis in such that the first and second cylindrical polishing pads rotate counter to one another and counter to a direction of travel of the disk; and
applying a slurry comprising diamond particles.

* * * * *